United States Patent
Takahashi

(10) Patent No.: US 9,120,421 B2
(45) Date of Patent: Sep. 1, 2015

(54) LIGHT PROJECTION DEVICE AND LIGHT GUIDE MEMBER USED IN SAME

(71) Applicant: Sharp Kabushiki Kaisha, Osaka-shi (JP)

(72) Inventor: Koji Takahashi, Osaka (JP)

(73) Assignee: SHARP KABUSHIKI KAISHA, Osaka-shi (JP)

(\*) Notice: Subject to any disclaimer, the term of this patent is extended or adjusted under 35 U.S.C. 154(b) by 194 days.

(21) Appl. No.: 13/758,725

(22) Filed: Feb. 4, 2013

(65) Prior Publication Data
US 2013/0201708 A1 Aug. 8, 2013

(30) Foreign Application Priority Data

Feb. 8, 2012 (JP) ................ 2012-024647

(51) Int. Cl.
| F21V 5/00 | (2015.01) |
| F21V 1/04 | (2006.01) |
| F21V 9/16 | (2006.01) |
| F21V 13/12 | (2006.01) |
| B60Q 1/00 | (2006.01) |
| B60Q 1/08 | (2006.01) |
| B60Q 1/34 | (2006.01) |
| F21S 8/10 | (2006.01) |

(52) U.S. Cl.
CPC ........... B60Q 1/04 (2013.01); B60Q 1/0047 (2013.01); B60Q 1/08 (2013.01); B60Q 1/34 (2013.01); F21S 48/115 (2013.01); F21S 48/1131 (2013.01); F21S 48/1145 (2013.01); F21S 48/1241 (2013.01); F21S 48/1747 (2013.01); F21S 48/215 (2013.01); F21S 48/2293 (2013.01); F21V 9/16 (2013.01); F21V 13/12 (2013.01); *F21S 48/328* (2013.01)

(58) Field of Classification Search
CPC ...... G02B 6/0001; G02B 6/00; G02B 6/0055; G02B 6/0021; G02B 6/0028; G02B 6/0046; G02B 6/0068; G02B 6/4206; G02B 19/0061; G02B 2207/113; G02B 23/26; G02B 6/0026; G02B 6/0073; G02B 6/24
USPC ................................. 362/511–582
See application file for complete search history.

(56) References Cited

U.S. PATENT DOCUMENTS

| 2003/0223686 A1 | 12/2003 | Ota et al. |
| 2005/0105301 A1* | 5/2005 | Takeda et al. ............. 362/545 |
| 2007/0014517 A1* | 1/2007 | Rizoiu et al. ............. 362/558 |

(Continued)

FOREIGN PATENT DOCUMENTS

| CN | 2828552 Y | 10/2006 |
| CN | 102121651 A | 7/2011 |
| JP | 2003-295319 | 10/2003 |
| JP | 2004-241142 | 8/2004 |
| JP | 2004-287181 | 10/2004 |
| JP | 2005-148538 | 6/2005 |
| JP | 2005-150041 | 6/2005 |

(Continued)

*Primary Examiner* — William Carter
(74) *Attorney, Agent, or Firm* — Morrison & Foerster LLP

(57) ABSTRACT

A light projection device that can change a light projection pattern is provided. The light projection device includes: a plurality of excitation light sources that emit excitation light; a fluorescent member that is excited by the excitation light from the excitation light sources; a control portion that controls outputs of the excitation light sources; and a light projection member that projects light emitted from the fluorescent member. The fluorescent member includes a plurality of application regions to which the excitation light is applied, and the control portion controls the outputs of the excitation light sources so as to individually control the excitation states of the application regions.

19 Claims, 15 Drawing Sheets

(56) References Cited

U.S. PATENT DOCUMENTS

| | | | |
|---|---|---|---|
| 2009/0052189 A1* | 2/2009 | Kon | 362/296.01 |
| 2011/0148280 A1 | 6/2011 | Kishimoto et al. | |
| 2011/0279007 A1 | 11/2011 | Kishimoto | |
| 2011/0280039 A1 | 11/2011 | Kishimoto | |
| 2013/0301288 A1 | 11/2013 | Kishimoto et al. | |

FOREIGN PATENT DOCUMENTS

| | | |
|---|---|---|
| JP | 2007-41623 | 2/2007 |
| JP | 2011-124088 | 6/2011 |
| JP | 2011-243373 | 12/2011 |
| JP | 2012-9381 | 1/2012 |

* cited by examiner

LIGHT PROJECTION DEVICE AND LIGHT GUIDE MEMBER USED IN SAME

This application is based on Japanese Patent Application No. 2012-024647 filed in Japan on Feb. 8, 2012, the contents of which are hereby incorporated by reference.

BACKGROUND OF THE INVENTION

1. Field of the Invention

The present invention relates to a light projection device and a light guide member used in such a light projection device, and more particularly relates to a light projection device that includes a fluorescent member to which excitation light is applied and a light guide member used in such a light projection device.

2. Description of the Related Art

Conventionally, a light projection device is known that includes a fluorescent member to which excitation light is applied. Such a light projection device is disclosed in, for example, JP-A-2003-295319.

JP-A-2003-295319 described above discloses a light source device (light projection device) that includes: an ultraviolet LD element functioning as a laser light source; a fluorescent material (fluorescent member) which converts laser light (excitation light) emitted from the ultraviolet LD element (LD: laser diode, semiconductor laser) into visible light; and a visible light reflective mirror which reflects visible light emitted from the fluorescent material. In the light source device described above, the visible light reflective mirror which reflects the visible light emitted from the fluorescent material is provided, and thus a predetermined region in the front of the light source device is illuminated.

Incidentally, when the light source device disclosed in JP-A-2003-295319 described above is used as, for example, an automobile headlight, it is necessary to control the light projection pattern of the light emitted from the light source device. Specifically, it is necessary to configure the light source device such that the light projection pattern is horizontally long. Although JP-A-2003-295319 described above does not disclose a light projection pattern, it is expected that the light projection pattern is circular. When the light source device disclosed in JP-A-2003-295319 described above is used as, for example, an automobile low beam (passing headlight), it is necessary to provide a light shielding plate in the light source device and thereby form the light projection pattern into a desired shape. In this case, since part of fluorescent light is shielded by the light shielding plate, the efficiency of utilization of the light is disadvantageously decreased.

In the automobile headlight, it is necessary to switch between a high beam (driving headlight) and a low beam (passing headlight). There is also a headlight that is operated according to steering or the drive of a blinker to illuminate, as with an AFS (adaptive front-lighting system) or a cornering light, an area in a direction in which the automobile turns. Hence, when the light source device disclosed in JP-A-2003-295319 described above is used as the automobile headlight, it is disadvantageously necessary to provide the light source device for each light projection pattern.

SUMMARY OF THE INVENTION

The present invention is made in view of the foregoing problems; an object of the present invention is to provide a light projection device that can change a light projection pattern and a light guide member used in such a light projection device.

In the present specification, the change of the light projection pattern means a conception including a case where the shape of the light projection pattern (the shape of the light projection region) is changed and a case where the density of the light projection pattern is changed (the light and dark of a certain region within the light projection region are changed).

To achieve the above object, according to the present invention, there is provided a light projection device including: a plurality of excitation light sources that emit excitation light; a fluorescent member that is excited by the excitation light from the excitation light sources; a control portion that controls outputs of the excitation light sources; and a light projection member that projects light emitted from the fluorescent member, in which the fluorescent member includes a plurality of application regions to which the excitation light is applied, and the control portion controls the outputs of the excitation light sources so as to individually control excitation states of the application regions.

In the light projection device of this invention, as described above, the excitation states of a plurality of application regions of the fluorescent member are individually controlled. In this way, it is possible to change the pattern of the light emitted from the fluorescent member, and thus it is possible to change the light projection pattern of the light emitted from the light projection device. Hence, since, in order to obtain a desired light projection pattern, it is not necessary to provide a light shielding plate that shields part of the fluorescent light, it is possible to reduce the decrease in the efficiency of utilization of the light. Moreover, since it is not necessary to provide the light projection device for each light projection pattern, it is possible to prevent the size of the light projection device as a whole from being increased.

As described above, the control portion only controls the outputs of a plurality of excitation light sources, and thereby can individually control the excitation states of a plurality of application regions and can change the light projection pattern of the light emitted from the light projection device. In other words, without provision of a mechanical structure, it is possible to change the light projection pattern only by performing electrical control. In this way, it is possible to prevent the size of the light projection device as a whole from being increased and prevent the structure of the light projection device from being complicated.

In the present specification and the scope of claims, the control on the excitation states means a conception including not only a case where control is performed for excitation or non-excitation but also a case where control is performed to carry out excitation with a high energy or carry out excitation with a low energy.

Preferably, the light projection device described above includes a plurality of light guide portions, each including a light entrance surface through which the excitation light enters the light guide portion and a light emission surface through which the excitation light is emitted toward the fluorescent member. In this configuration, it is possible to easily and individually control the excitation states of a plurality of application regions.

Preferably, in the light projection device including a plurality of light guide portions described above, each of the application regions is specified by a shape of the light emission surface of the corresponding light guide portion. In this configuration, since it is possible to easily form each of the application regions in a desired shape, it is possible to easily form the light projection pattern of the light emitted from the light projection device in a desired shape.

Preferably, in the light projection device including a plurality of light guide portions described above, the light emission surface has a smaller area than the light entrance surface. In this configuration, the excitation light entering the light entrance surface is emitted from the light emission surface in a state where the light is collected.

Preferably, in the light projection device described above, a plurality of application regions are selectively excited. In this configuration, it is possible to easily change the shape of the light projection pattern.

Preferably, in the light projection device described above, the fluorescent member is excited in an asymmetrical shape with respect to a predetermined direction. In this configuration, it is possible to easily form the light projection pattern in the asymmetrical shape with respect to the predetermined direction.

Preferably, in the light projection device described above, the focus of the light projection member is arranged in an edge portion of the application region. In this configuration, it is possible to steeply switch light and dark in a portion corresponding to the edge portion of the application region where the focus of the light projection member is arranged.

Preferably, in the light projection device where the focus of the light projection member is arranged in the edge portion of the application region, the light projection device is used as an automobile headlight, and the focus of the light projection member is arranged in such a part of the edge portion of the application region that a cutoff line of the light projection pattern is projected. In this configuration, it is possible to steeply switch light and dark in the cutoff line, and thus it is particularly effective.

In the present specification and the scope of claims, the cutoff line is a division line for the light and dark of the light projection pattern of the low beam (passing headlight). In the cutoff line, it is required to steeply switch light and dark.

Preferably, in the light projection device where the focus of the light projection member is arranged in such a part of the edge portion of the application region that the cutoff line of the light projection pattern is projected, the focus of the light projection member is arranged in such a position of the application region that an elbow point of the light projection pattern is projected. In this configuration, it is possible to steeply switch light and dark in the vicinity of the elbow point, and thus it is more effective. It is also possible to maximize the brightness of the vicinity of the elbow point. In other words, it is possible to maximize the brightness of a region directly in front of the automobile.

In the present specification and the scope of claims, the elbow point is the intersection of the cutoff lines of the left half and right half of the light projection pattern of the low beam (passing headlight).

Preferably, in the light projection device described above, the light projection member includes a lens that transmits the light emitted from the fluorescent member. In this configuration, it is possible to easily project the light emitted from the fluorescent member in a predetermined direction.

Preferably, in the light projection device where the light projection member includes the lens, the light projection member includes the lens and a reflective member having a reflective surface that reflects the light emitted from the fluorescent member toward the lens, the reflective surface is formed with an elliptical surface, a first focus of the reflective surface is arranged in the application region and a second focus of the reflective surface coincides with a focus of the lens. In this configuration, the light emitted from the application region is reflected off the reflective surface, passes through the second focus of the reflective surface and is projected by the lens. Here, since the second focus of the reflective surface coincides with the focus of the lens, the light projection pattern formed by the lens is more likely to reflect the shape of the application region. When the light is projected using the lens, as compared with the case where the light is projected using the reflective member without provision of the lens, the light projection pattern is more likely to reflect the shape of the application region. The reflective member is provided, and thus it is possible to utilize, as illumination light, a large part of the light emitted from the fluorescent member as compared with the case where the light is projected using the lens without provision of the reflective member. In this way, it is possible to enhance the efficiency of utilization of the light.

In the present specification and the scope of claims, the first focus is a focus that is closer to the vertex of the reflective surface, and the second focus is a focus that is farther away from the vertex of the reflective surface.

Preferably, in the light projection device where the light projection member includes the lens, the focus of the lens is arranged in the application region. In this configuration, the light projection pattern formed by the lens is more likely to reflect the shape of the application region. When the light is projected using the lens, as compared with a case where the light is projected by the reflective member without provision of the lens, the light projection pattern is more likely to reflect the shape of the application region.

Preferably, in the light projection device described above, the fluorescent member includes a first fluorescent member to which the excitation light is applied to emit white light and a second fluorescent member to which the excitation light is applied to emit orange-colored light, the first fluorescent member functions as a light source of an automobile headlight and the second fluorescent member functions as a light source of an automobile blinker. In this configuration, one light projection device can be made to function both as a headlight and as a blinker, and thus it is particularly effective.

In this case, preferably, the second fluorescent member is intermittently excited. In this configuration, the light projection device can be easily made to function as an automobile blinker.

Preferably, in the light projection device described above, the control portion individually controls the outputs of the excitation light sources. In this configuration, it is possible to easily and individually control the excitation states of a plurality of application regions.

Preferably, in the light projection device described above, the excitation light includes laser light.

Preferably, in the light projection device described above, the light projection device is used as a vehicle lighting unit.

Preferably, in the light projection device used as an automobile lighting unit, the light projection device is used as an automobile passing headlight and an automobile driving headlight. In this configuration, it is not necessary to separately provide a passing headlight and a driving headlight, and thus it is possible to prevent the size of the light projection device as a whole from being increased.

Preferably, in the light projection device used as an automobile lighting unit, the light projection device is used as at least one of an automobile AFS and a cornering light.

According to the present invention, there is provided a light guide member that is used in a light projection device including a plurality of light guide portions and that includes a plurality of light guide portions.

DETAILED DESCRIPTION OF THE PREFERRED EMBODIMENTS

Embodiments of the present invention will be described below with reference to accompanying drawings. For ease of understanding, no hatching may be performed even in a cross-sectional view, and hatching may be performed even in a diagram other than a cross-sectional view.

First Embodiment

The structure of a light projection device 1 according to a first embodiment of the present invention will first be described with reference to FIGS. 1 to 11.

Figure 1:
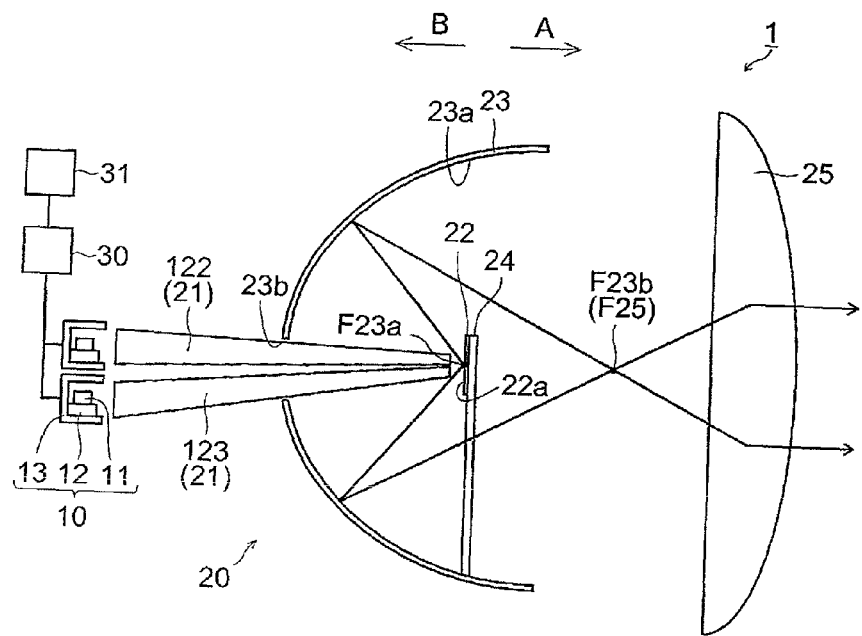
FIG. 1 is a cross-sectional view showing the structure of a light projection device according to a first embodiment of the present invention.

The light projection device 1 according to the first embodiment of the present invention is used as a headlight (lighting unit) that illuminates, for example, an area in front of an automobile (vehicle). As shown in FIG. 1, the light projection device 1 includes a plurality of laser generation devices 10 that function as a laser light source and a light projection unit 20 that utilizes laser light emitted from the laser generation devices 10 to project light in a predetermined direction (A direction).

The laser generation device 10 is a so-called CAN package semiconductor laser, and includes a semiconductor laser element (excitation light source) 11, a heat spreader 12 on which the semiconductor laser element 11 is mounted with solder or the like (not shown) and a metallic holding member 13 that holds these components.

The semiconductor laser element 11 is, for example, a wide-stripe laser, and emits laser light functioning as excitation light. The semiconductor laser element 11 is configured to emit, for example, blue-violet laser light having a center wavelength of about 405 nm. The output of each semiconductor laser element 11 is, for example, 1 W.

The heat spreader 12 functions as a heat dissipation member that dissipates heat generated from the semiconductor laser element 11, and also functions as a mounting substrate on which a plurality of semiconductor laser elements 11 are mounted. The heat spreader 12 is formed with, for example, a nitride aluminum flat plate, and is soldered to the bottom surface of the holding member 13. On the mounting surface of the heat spreader 12, a plurality of electrode patterns (not shown) electrically connected to the semiconductor laser elements 11 are formed.

The outside shape of the holding member 13 is formed such that its diameter is, for example, 5.6 mm, and is formed in the shape of a cylinder having an opening portion in the side where the laser light is emitted. In the opening portion of the holding member 13, a glass plate (not shown) that transmits the laser light is attached, and an inert gas is sealed in the holding member 13. In the holding member 13, a heat dissipation fin or the like (not shown) may be provided; for example, the holding member 13 may be cooled with air.

A power supply portion 30 that supplies power to the semiconductor laser elements 11 is connected to the laser generation devices 10. The power supply portion 30 can individually energize and drive the semiconductor laser elements 11. The power supply portion 30 is connected to a control portion 31 that controls the whole of the light projection device 1, and switches, based on a control signal from the control portion 31, the semiconductor laser element 11 between the drive and the stop. The control portion 31 individually controls the outputs of the semiconductor laser elements 11. In the present embodiment, the control portion 31 individually controls the drives of the semiconductor laser elements 11. The control portion 31 is connected to, for example, a main switch (not shown) that is operated by a driver to turn on or off the light projection device 1, a switch for switching between a low beam and a high beam and the switch of a blinker (not shown).

The laser generation devices 10 are arranged opposite the light entrance surface of a light collection member 21 of the light projection unit 20, which will be described latter, and the laser light emitted from the laser generation devices 10 enters the light collection member 21. In the present embodiment, four laser generation devices 10, two laser generation devices 10, one laser generation device 10 and one laser generation device 10 are respectively provided in light collection portions 121, 122, 123 and 124, which will be described later, of the light collection member 21. The laser generation devices 10 may be fixed with a transparent adhesive layer or the like to, for example, the light entrance surface of the light collection member 21 of the light projection unit 20.

The light projection unit 20 is arranged on the laser light emission side of the laser generation devices 10 (the semiconductor laser elements 11), and includes: the light collection member 21 (light guide member) that guides the laser light from the laser generation devices 10 while collecting it; a fluorescent member 22 that converts at least part of the laser light emitted from the light collection member 21 into fluorescent light and that emits it; a reflective member 23 (light projection member) that reflects the fluorescent light emitted from the fluorescent member 22 in a predetermined direction; a support member 24 that supports the fluorescent member 22; and a lens 25 (light projection member) that is arranged in front of the reflective member 23 (toward the A direction).

The light collection member 21 is formed with a translucent member. Examples of the material of the light collection member 21 include glasses such as a borosilicate crown optical glass (BK7) and a synthetic silica and a resin.

Figure 2:
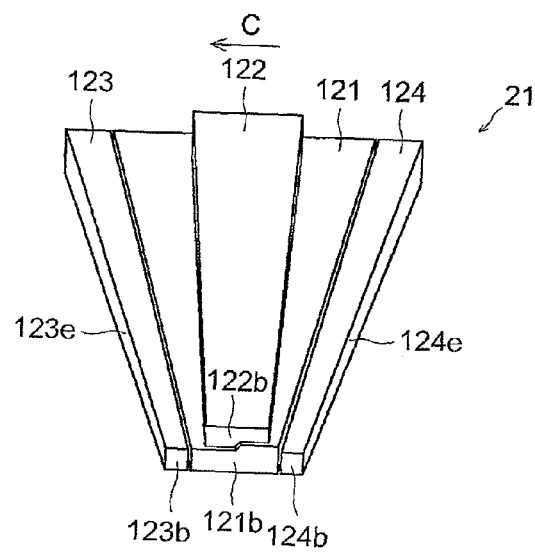
FIG. 2 is a perspective view showing the structure of a light collection member shown in FIG. 1 and according to the first embodiment of the present invention.

In the present embodiment, as shown in FIGS. 1 and 2, the light collection member 21 includes the four light collection portions (light guide portions) 121, 122, 123 and 124.

Figure 3:
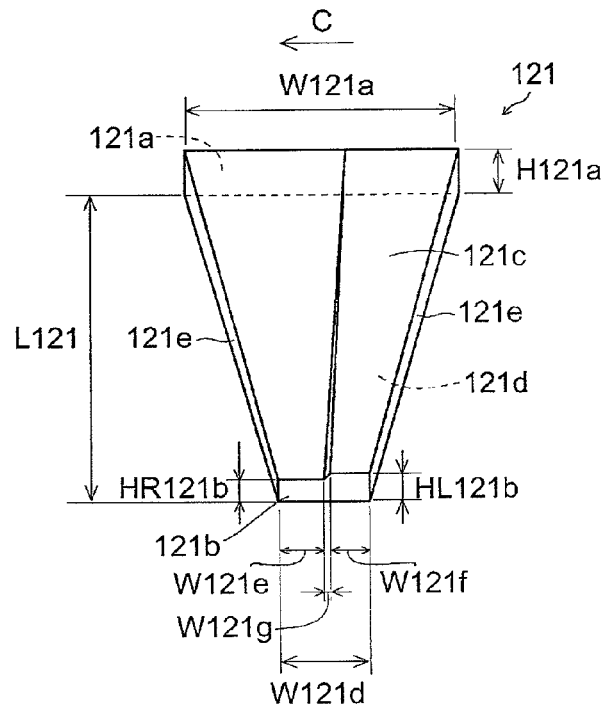
FIG. 3 is a perspective view showing the structure of a light collection portion 121 shown in FIG. 2 and according to the first embodiment of the present invention.

As shown in FIG. 3, the light collection portion 121 includes: a light entrance surface 121*a* through which the laser light (excitation light) emitted from the four semiconductor laser elements 11 (see FIG. 1) enters the light collection portion 121; a light emission surface 121*b* through which the laser light is emitted to the fluorescent member 22; and an upper surface 121*c*, a lower surface 121*d* and a pair of side surfaces 121*e* that are arranged between the light entrance surface 121*a* and the light emission surface 121*b*.

The light entrance surface 121*a* is formed in the shape of a rectangle, and is formed such that the light emission surface 121*b* has a smaller area than the light entrance surface 121*a*. The light emission surface 121*b* is formed to be asymmetrical with respect to a left/right direction, and is formed in a shape corresponding to the light projection pattern of a low beam (passing headlight). Specifically, the light entrance surface 121*a* has a height of about 3 mm (H121*a*) and a width of about 18 mm (W121*a*). The light emission surface 121*b* is formed in such a shape that an upper right portion (an upper left portion in FIG. 3) is cut, and has different heights on the left and right sides. The left means a left side (the opposite side to a C direction) when seen in a direction in which the automobile drives; it is the right in FIG. 3. The right means a right side (the side of the C direction) when seen in the direction in which the automobile drives; it is the left in FIG. 3. The left portion of the light emission surface 121*b* has a height of about 1.9 mm (HL121*b*), and the right portion thereof has a height of about 1.5 mm (HR121*b*). The end portion of the lower surface 121*d* on the side of the light emission surface 121*b* has a width of about 6 mm (W121*d*). In FIG. 3, W121*e* has a width of about 3 mm, and W121*f* has a width of about 2.6 mm. W121*g* has a width of about 0.4 mm. The light collection portion 121 has a length of about 50 mm (L121).

Figure 4:
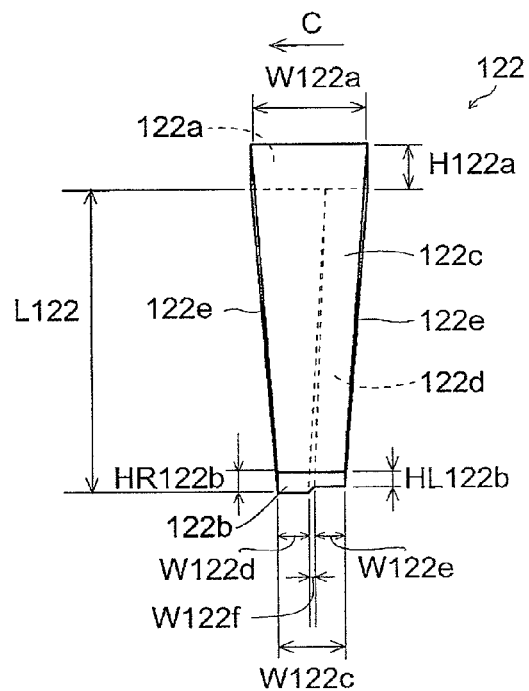
FIG. 4 is a perspective view showing the structure of a light collection portion 122 shown in FIG. 2 and according to the first embodiment of the present invention.

As shown in FIG. 4, the light collection portion 122 includes: a light entrance surface 122*a* through which the laser light emitted from the two semiconductor laser elements 11 enters the light collection portion 122; a light emission surface 122*b* through which the laser light is emitted; and an upper surface 122*c*, a lower surface 122*d* and a pair of side surfaces 122*e* that are arranged between the light entrance surface 122*a* and the light emission surface 122*b*.

The light entrance surface 122*a* is formed in the shape of a rectangle, and is formed such that the light emission surface 122*b* has a smaller area than the light entrance surface 122*a*. The light emission surface 122*b* is formed to be asymmetrical with respect to the left/right direction, and is formed, by being combined with the light emission surface 121*b* of the light collection portion 121, in a shape corresponding to the light projection pattern of a high beam (driving headlight). Specifically, the light entrance surface 122*a* has a height of about 3 mm (H122*a*) and a width of about 6 mm (W122*a*). The light emission surface 122*b* is formed in such a shape that a lower left portion is cut, and has different heights on the left and right sides. The left portion of the light emission surface 122*b* has a height of about 1 mm (HL122*b*), and the right portion thereof has a height of about 1.4 mm (HR122*b*). The end portion of the upper surface 122*c* on the side of the light emission surface 122*b* has a width of about 4.4 mm (W122*c*). In FIG. 4, W122*d* has a width of about 2 mm, and W122*e* has a width of about 2 mm. W121*f* has a width of about 0.4 mm. The light collection portion 122 has a length of about 50 mm (L122).

Figure 5:
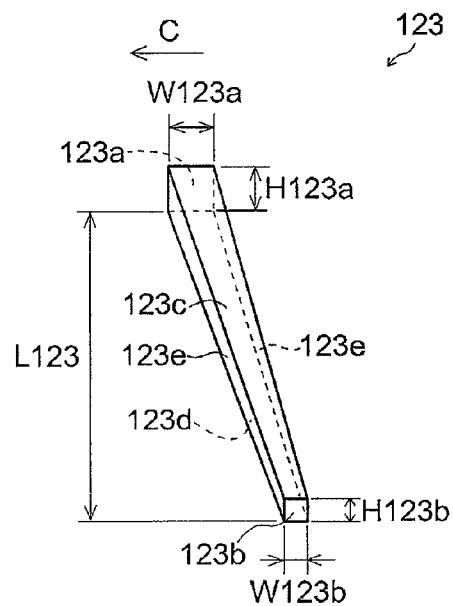
FIG. 5 is a perspective view showing the structure of a light collection portion 123 shown in FIG. 2 and according to the first embodiment of the present invention.

As shown in FIG. 5, the light collection portion 123 includes: a light entrance surface 123*a* through which the laser light emitted from the one semiconductor laser element 11 enters the light collection portion 123; a light emission surface 123*b* through which the laser light is emitted; and an upper surface 123*c*, a lower surface 123*d* and a pair of side surfaces 123*e* that are arranged between the light entrance surface 123*a* and the light emission surface 123*b*.

The light entrance surface 123*a* is formed in the shape of a square, and is formed in such a square that the light emission surface 123b has a smaller area than the light entrance surface 123a. Specifically, the light entrance surface 123a has a height of about 3 mm (H123a) and a width of about 3 mm (W123a). The light emission surface 123b has a height of about 1.5 mm (H123b) and a width of about 1.5 mm (W123b). The light collection portion 123 has a length of about 50 mm (L123).

Figure 6:
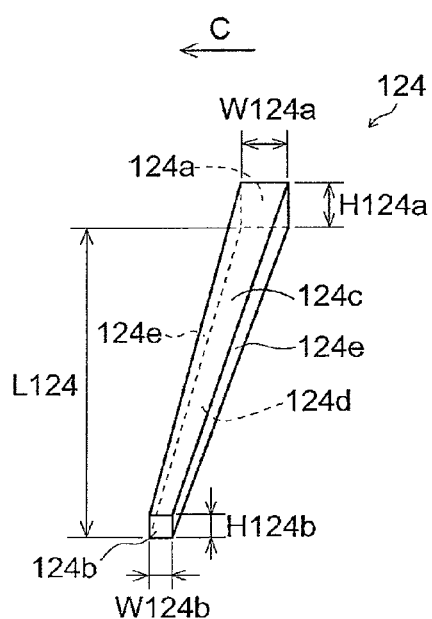
FIG. 6 is a perspective view showing the structure of a light collection portion 124 shown in FIG. 2 and according to the first embodiment of the present invention.

As shown in FIG. 6, the light collection portion 124 is formed in a shape obtained by reversing the left and right portions of the light collection portion 123, and includes: a light entrance surface 124a through which the laser light emitted from the one semiconductor laser element 11 enters the light collection portion 124; a light emission surface 124b through which the laser light is emitted; and an upper surface 124c, a lower surface 124d and a pair of side surfaces 124e that are arranged between the light entrance surface 124a and the light emission surface 124b.

The light entrance surface 124a is formed in the shape of a square, and is formed such a square that the light emission surface 124b has a smaller area than the light entrance surface 124a. Specifically, the light entrance surface 124a has a height of about 3 mm (H124a) and a width of about 3 mm (W124a). The light emission surface 124b has a height of about 1.5 mm (H124b) and a width of about 1.5 mm (W124b). The light collection portion 124 has a length of about 50 mm (L124).

Figure 7:
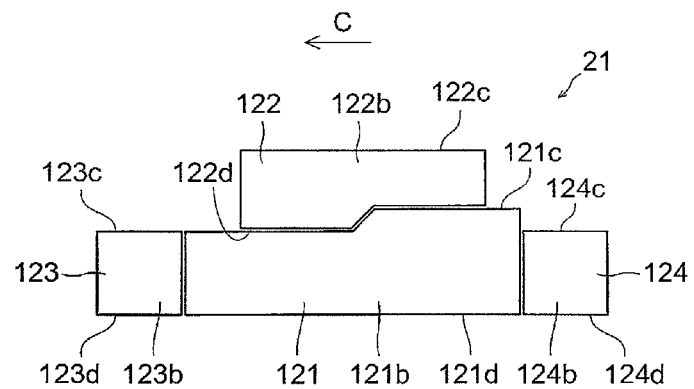
FIG. 7 is a front view showing the structure of a light emission surface of the light collection member shown in FIG. 1 and according to the first embodiment of the present invention.

The four light collection portions 121 to 124 are spaced, as shown in FIGS. 2 and 7, a predetermined distance apart from each other.

On the light entrance surfaces 121a to 124a and light emission surfaces 121b to 124b of the light collection member 21, an unillustrated AR (anti-reflection) film may be formed.

The light emission surfaces 121b to 124b may be formed into a frosted glass rough surface or a so-called moth-eye shape. In this case, it is possible to significantly enhance the efficiency when the laser light is taken to the outside from the interior of the light collection portions 121 to 124 through the light emission surfaces 121b to 124b. When the light emission surfaces 121b to 124b are flat surfaces, if the laser light reaches the light emission surfaces 121b to 124b within the light collection portions 121 to 124, the laser light is reflected off the inner sides of the light emission surfaces 121b to 124b, and thus a laser light component that cannot be taken to the outside is produced. On the other hand, the light emission surfaces 121b to 124b are formed into a frosted glass rough surface or a so-called moth-eye shape, and thus the reflection of the laser light off the inner sides of the light emission surfaces 121b to 124b is reduced, with the result that it is possible to efficiently take the light to the outside.

The upper surfaces 121c to 124c, the lower surfaces 121d to 124d and the pairs of side surfaces 121e to 124e of the light collection member 21 have the function of reflecting the laser light entering the light entrance surfaces 121a to 124a and guiding it to the light emission surfaces 121b to 124b.

The travel of the laser light entering the light collection member 21 will now be described briefly. The laser light emitted from the semiconductor laser element 11 enters the light collection member 21 through the light entrance surfaces 121a to 124a. Then, the laser light is totally reflected off the upper surfaces 121c to 124c, the lower surfaces 121d to 124d and the pairs of side surfaces 121e to 124e in a repeated manner, is guided to the light emission surfaces 121b to 124b while being collected and is emitted to the outside through the light emission surfaces 121b to 124b. Here, although the light intensity distribution of the laser light emitted from the semiconductor laser element 11 is Gaussian distribution, since the laser light is, as described above, collected and guided while being repeatedly reflected within the light collection member 21, the light intensity distribution of the laser light on the light emission surfaces 121b to 124b of the light collection member 21 becomes uniform. Thus, it is possible to reduce the production of a portion having an excessive light density in an application surface 22a of the fluorescent member 22, which will be described later. In this way, it is possible to reduce the degradation of a fluorescent material and a binder contained in the fluorescent member 22 by heat and the degradation thereof resulting from the occurrence of a chemical reaction by light. The light collection member 21 is not limited to a light collection member in which the light is guided by utilizing total reflection; the light collection member 21 may be a light collection member in which the light is guided by utilizing only reflection.

Figure 8:
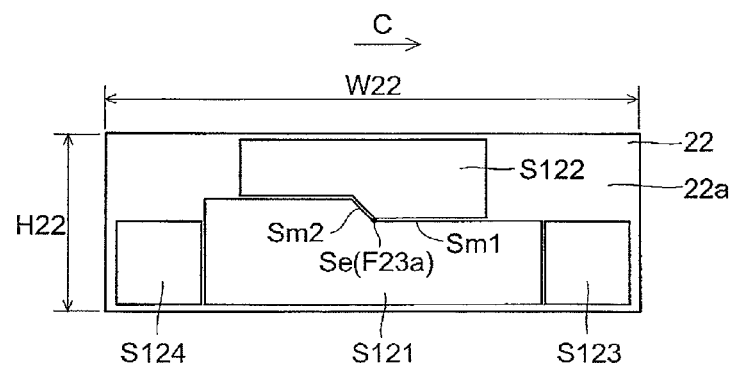
FIG. 8 is a front view showing the structure of an application surface of a fluorescent member shown in FIG. 1 and according to the first embodiment of the present invention.

As shown in FIG. 1, the fluorescent member 22 has the application surface 22a to which the laser light is applied. The application surface 22a is arranged in a position, for example, about 1.5 mm away from the light emission surfaces 121b to 124b of the light collection member 21. As shown in FIG. 8, the fluorescent member 22 has a height of about 3.2 mm (H22), a width of about 9.5 mm (W22) and a uniform thickness of about 0.1 mm. With the fluorescent member 22 that has only an area corresponding to the area to which the laser light is applied, the laser light may be applied to the entire application surface 22a of the fluorescent member 22.

The fluorescent member 22 is formed with three types of fluorescent material particles that convert, for example, blue-violet light (excitation light) into red light, green light and blue light and emit them. An example of a fluorescent material that converts the blue-violet light into the red light is $CaAlSiN_3$:Eu. An example of a fluorescent material that converts the blue-violet light into the green light is $\beta$-SiAlON:Eu. An example of a fluorescent material that converts the blue-violet light into the blue light is (Ba, Sr) $MgAl_{10}O_{17}$:Eu. These fluorescent materials are bound with an inorganic binder (such as silica or $TiO_2$). The fluorescent light of the red light, the green light and the blue light emitted from the fluorescent member 22 is mixed, and thus it is possible to obtain white light. The red light is, for example, light that has a center wavelength of about 640 nm; the green light is, for example, light that has a center wavelength of about 520 nm. The blue light is, for example, light that has a center wavelength of about 450 nm.

As shown in FIG. 1, the fluorescent member 22 is arranged in a region including a first focus F23a of the reflective surface 23a of the reflective member 23. The fluorescent member 22 is provided on the support member 24 formed of a metal such as aluminum. For example, the fluorescent member 22 is formed by applying a resin containing the fluorescent material particles onto the support member 24 and curing it. The support member 24 is fixed to the reflective surface 23a of the reflective member 23. The support member 24 may be formed of, for example, a glass or a resin that transmits light emitted from the fluorescent member 22. If the support member 24 is formed of a metal, it is possible to efficiently dissipate heat generated in the fluorescent member 22. On the other hand, the support member 24 is formed of a transparent glass or resin, and thus it is possible to reduce the shielding of the light by the support member 24, with the result that it is possible to enhance the efficiency of utilization of the light.

As shown in FIG. 8, the fluorescent member 22 includes a plurality of application regions S121, S122, S123 and S124 to which the laser light (excitation light) is applied. Specifically, the fluorescent member 22 includes: the application region S121 corresponding to the light emission surface 121b of the light collection portion 121; the application region S122 corresponding to the light emission surface 122*b* of the light collection portion 122; the application region S123 corresponding to the light emission surface 123*b* of the light collection portion 123; and the application region S124 corresponding to the light emission surface 124*b* of the light collection portion 124. The shapes of the application regions S121 to S124 are respectively specified by the shapes of the corresponding light emission surfaces 121*b* to 124*b* of the light collection member 21.

The application region S121 is formed to be asymmetrical in a left/right direction (predetermined direction) such that a light projection pattern P121 (see FIG. 11) of a low beam (passing headlight) is a projection image, and is formed in a shape obtained by cutting an upper right portion. In the application region S121, lines Sm1 and Sm2 and a point Se are formed such that the cutoff lines M1 and M2 and the elbow point E (see FIG. 11) of the light projection pattern P121, which will be described later, are a projection image. These lines Sm1 and Sm2 form a part of an edge portion of the application region S121. The point Se is an intersection of the lines Sm1 and Sm2.

The application region S122 is formed such that the application region S122 is combined with the application region S121 and thus the light projection pattern of the high beam (driving headlight) is a projection image. The application regions S123 and S124 are respectively formed on the right side (the side of the C direction) and the left side of the application region S121.

The excitation states of the application regions S121 to S124 are individually controlled, as will be described later. In the present embodiment, the application regions S121 to S124 are selectively excited.

As shown in FIG. 1, the reflective surface 23*a* of the reflective member 23 is arranged opposite the application surface 22*a* of the fluorescent member 22, and has the function of reflecting the light emitted from the fluorescent member 22 toward the lens 25. The reflective surface 23*a* is formed so as to include part of an elliptical surface. Specifically, the reflective surface 23*a* is formed in a shape obtained by dividing the elliptical surface by a plane perpendicular (intersecting) an axis connecting the first focus F23*a* and the second focus F23*b*. The reflective surface 23*a* has a depth (a length in a B direction) of about 30 mm, and is formed in the shape of a circle having a radius of about 15 mm as seen in a light projection direction (A direction).

As shown in FIG. 8, the first focus F23*a* of the reflective surface 23*a* of the reflective member 23 is arranged to substantially coincide with the point Se (the intersection of the lines Sm1 and Sm2) of the application region S121 of the fluorescent member 22. In other words, the first focus F23*a* is arranged in a position where the elbow point E, which will be described later, of the light projection pattern P121 of the application region S121 is projected.

As shown in FIG. 1, in the vertex of the reflective member 23, a through hole 23*b* is formed. The light collection member 21 is inserted through the through hole 23*b*.

The reflective member 23 may be formed of a metal or may be formed by providing a reflective film on the surface of a resin.

The lens 25 is arranged in front of the reflective member 23. The lens 25 has a diameter of about 35 mm. The lens 25 transmits the light that is emitted from the fluorescent member 22 and is reflected off the reflective member 23, and emits it to the outside of the light projection device 1. The focus F25 of the lens 25 substantially coincides with the second focus F23*b* of the reflective surface 23*a* of the reflective member 23. The lens 25 may be a plano-convex, bicovex or formed in another shape.

In the present embodiment, the light emitted from the application regions S121 to S124 of the fluorescent member 22 is reflected off the reflective surface 23*a* of the reflective member 23, passes through the second focus F23*b* (or the vicinity thereof) of the reflective surface 23*a* and is projected through the lens 25. Then, a light projection pattern 25 meters in front of the light projection device 1 is one that is obtained by projecting the application regions S121 to S124.

Figure 9:
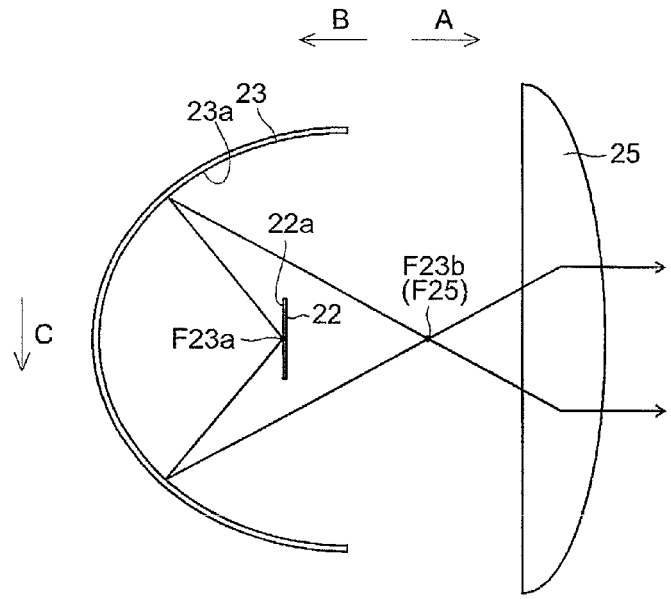
FIG. 9 is a diagram for illustrating light emitted from the light projection device shown in FIG. 1 and according to the first embodiment of the present invention.
Figure 10:
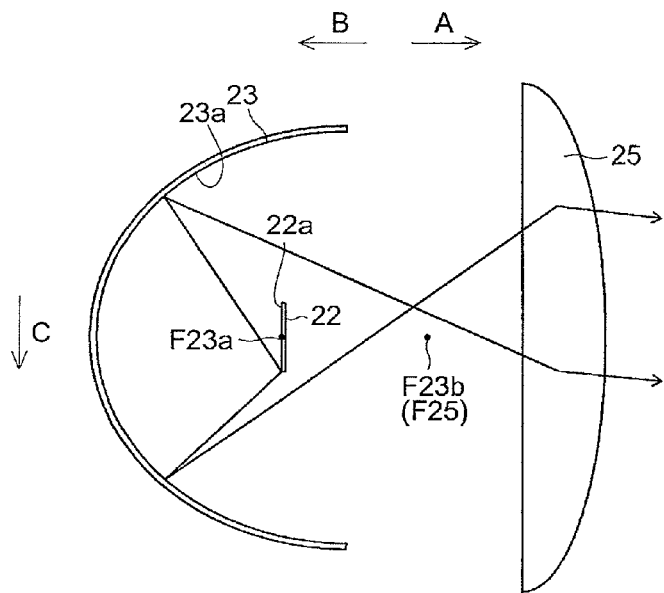
FIG. 10 is a diagram for illustrating light emitted from the light projection device shown in FIG. 1 and according to the first embodiment of the present invention.

As shown in FIG. 9, the light emitted from a portion corresponding to the focus F23*a* of the reflective surface 23*a* of the fluorescent member 22 is converted by the reflective member 23 and the lens 25 into parallel light and is projected. On the other hand, as shown in FIG. 10, light emitted from a position displaced to, for example, the right side (the side of the C direction) from the focus F23*a* of the reflective surface 23*a* is projected while the light is extended by the reflective member 23 and the lens 25 to the right side.

The operation of the light projection device 1 and a light projection pattern P will now be described with respect to FIGS. 8 and 11 to 15.

Figure 11:
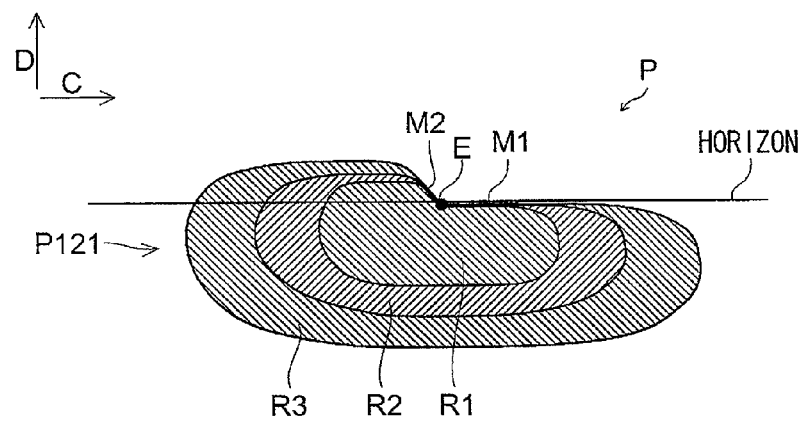
FIG. 11 is a diagram for illustrating a light projection pattern 25 meters in front of the light projection device shown in FIG. 1 and according to the first embodiment of the present invention.

In the light projection device 1, when the main switch of the light projection device 1 is turned on by the driver, the four semiconductor laser elements 11 corresponding to the light collection portion 121 are energized and driven by the control portion 31. Here, the application region S121 (see FIG. 8) of the fluorescent member 22 is excited, and light is emitted from the application region S121. The light emitted from the application region S121 is projected by the reflective member 23 and the lens 25. Then, the light projection pattern P (=P121) 25 meters in front of the light projection device 1 is formed as shown in FIG. 11, and thus it is possible to obtain the low beam light projection pattern.

Specifically, the light projection pattern P121 is not extended in an upper right direction, and is extended in the left/right direction (horizontal direction) and in a downward direction. In the light projection pattern P121 described above, light and dark are steeply switched on the cutoff lines M1 and M2, and illumination light is not applied to the upper side region on the cutoff lines M1 and M2. In other words, the light projection pattern P121 is formed in a shape obtained by cutting an upper right portion. Thus, it is possible to reduce glare light given to the driver of an oncoming automobile. Moreover, the illuminance of a region R1 (region directly in front of the automobile) in the vicinity of the elbow point E, which is the intersection of the cutoff lines M1 and M2, is the highest, and, as an area moves away from the region R1, its illuminance is decreased. In other words, the regions R1, R2 and R3 are decreased in illuminance in this order.

Figure 12:
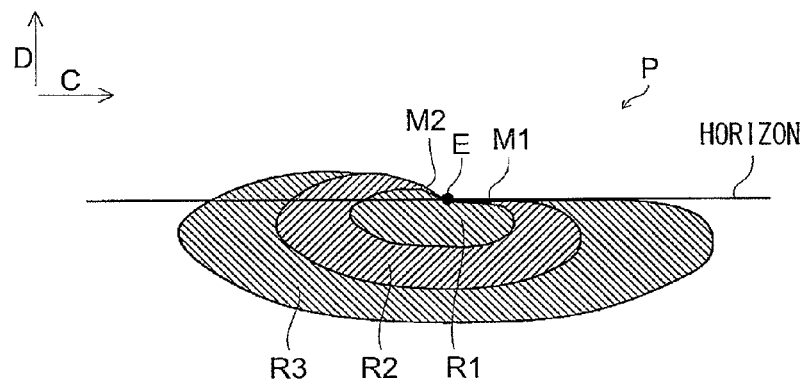
FIG. 12 is a diagram for illustrating a light projection pattern required for a low beam of an automobile.

In a country, such as Japan, in which automobiles drive on the left side, the low beam of an automobile is required to have, as shown in FIG. 12, a light projection pattern P obtained by cutting an upper right portion. On the cutoff lines M1 and M2, in order to prevent glare light from being given to the driver of an oncoming automobile, it is necessary to steeply switch light and dark.

Figure 13:
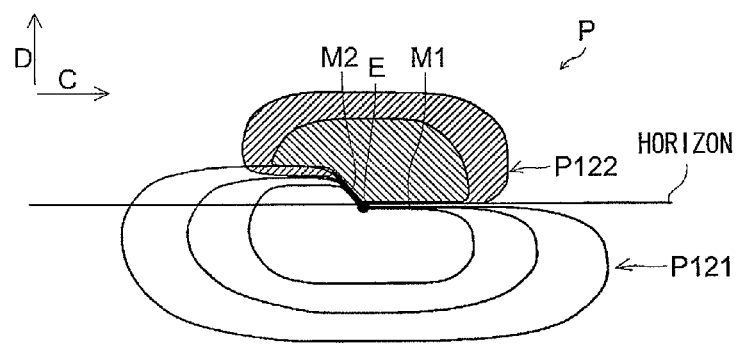
FIG. 13 is a diagram for illustrating a light projection pattern 25 meters in front of the light projection device shown in FIG. 1 and according to the first embodiment of the present invention.

Then, when the switch for switching the low beam and the high beam is operated by the driver, and the low beam is switched to the high beam, the two semiconductor laser elements 11 corresponding to the light collection portion 122 are further energized and driven by the control portion 31. Here, the application regions S121 and S122 (see FIG. 8) of the fluorescent member 22 are excited, and light is emitted from the application regions S121 and S122. Then, the light projection pattern P becomes a light projection pattern P (=P121+P122) as shown in FIG. 13, and thus it is possible to obtain the high beam light projection pattern. In FIG. 13, only the light projection pattern P122 is hatched.

Figure 14:
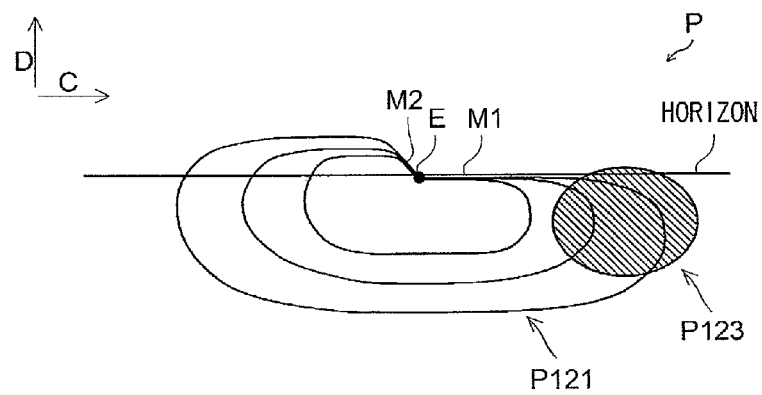
FIG. 14 is a diagram for illustrating a light projection pattern 25 meters in front of the light projection device shown in FIG. 1 and according to the first embodiment of the present invention.

When the automobile turns right, if a switch for a right blinker is turned on by the driver or if a steering wheel (steering) is operated to turn right, the one semiconductor laser element 11 corresponding to the light collection portion 123 is further energized and driven by the control portion 31. Here, for example, when the beam is set at the low beam, the application regions S121 and S123 (see FIG. 8) of the fluorescent member 22 are excited, and light is emitted from the application regions S121 and S123. Then, the light projection pattern P is extended rightward to become a light projection pattern P (=P121+P123) as shown in FIG. 14. In other words, it is possible to illuminate an area in a direction in which the automobile turns. In FIG. 14, only the light projection pattern P123 is hatched.

Figure 15:
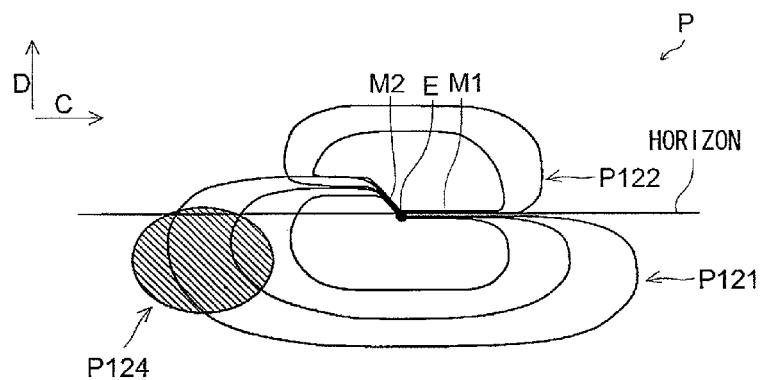
FIG. 15 is a diagram for illustrating a light projection pattern 25 meters in front of the light projection device shown in FIG. 1 and according to the first embodiment of the present invention.

When the automobile turns left, if a switch for a left blinker is turned on by the driver or if the steering wheel (steering) is operated to turn left, the one semiconductor laser element 11 corresponding to the light collection portion 124 is energized and driven by the control portion 31. Here, for example, when the beam is set at the high beam, the application regions S121, S122 and S124 (see FIG. 8) of the fluorescent member 22 are excited, and light is emitted from the application regions S121, S122 and S124. Then, the light projection pattern P is extended leftward to become a light projection pattern P (=P121+P122+P124) as shown in FIG. 15. In FIG. 15, only the light projection pattern P124 is hatched.

As described above, the light projection device 1 functions as the low beam and the high beam and also functions as a cornering light (or an AFS) illuminating an area in a direction in which the automobile turns.

Regardless of a right turn or a left turn, the semiconductor laser elements 11 corresponding to the light collection portions 123 and 124 may be able to be driven. In this case, it is possible to illuminate a region wide in the left/right direction. For example, when the automobile drives at a high speed, only the semiconductor laser elements 11 corresponding to the light collection portions 121 and 122 may be driven, and only the application regions S121 and S122 of the fluorescent member 22 may be excited. In this case, it is possible to reduce the unnecessary illumination of left and right regions. Moreover, for example, when the automobile drives at a low speed in an urban area or the like, all the semiconductor laser elements 11 may be driven, and all the application regions S121 to S124 of the fluorescent member 22 may be excited. In this case, it is possible to illuminate a region wide in the left/right direction. An automobile speed sensor for detecting the speed of the automobile is connected to the control portion 31, and thus it is possible to easily control the illumination region (light projection region) of the light projection device according to the speed of the automobile.

In the present embodiment, as described above, the excitation states of the application regions S121, S122, S123 and S124 of the fluorescent member 22 are individually controlled. In this way, it is possible to change the pattern of the light emitted from the fluorescent member 22, and thus it is possible to change the light projection pattern P of the light emitted from the light projection device 1. Hence, since, in order to obtain a desired light projection pattern P, it is not necessary to provide a light shielding plate for shielding part of the fluorescent light, it is possible to reduce the decrease in the efficiency of utilization of the light. Moreover, since it is not necessary to provide the light projection device 1 for each light projection pattern P, it is possible to prevent the size of the light projection device 1 as a whole from being increased.

The control portion 31 only controls the energizing of a plurality of semiconductor laser elements 11, and thereby can individually control the excitation states of the application regions S121, S122, S123 and S124 of the fluorescent member 22 and change the light projection pattern P of the light emitted from the light projection device 1. Hence, for example, it is not necessary to provide the light projection device 1 for each necessary light projection pattern P and a mechanical structure (for example, a mechanism for mechanically rotating the reflective member) for changing the light projection pattern P. In other words, without provision of a mechanical structure, it is possible to change the light projection pattern P only by performing electrical control. In this way, it is possible to prevent the size of the light projection device 1 as a whole from being increased and prevent the structure of the light projection device 1 from being complicated.

As described above, the light collection portions 121, 122, 123 and 124 are provided, and thus it is possible to easily and individually control the excitation states of the application regions S121, S122, S123 and S124.

As described above, the application regions S121, S122, S123 and S124 are respectively specified by the shapes of the corresponding light emission surfaces 121b, 122b, 123b and 124b. In this way, each of the application regions S121, S122, S123 and S124 can be easily formed into a desired shape, and thus the light projection pattern P of the light emitted from the light projection device 1 can be easily formed into a desired shape.

As described above, the light emission surfaces 121b, 122b, 123b and 124b respectively have a smaller area than the light entrance surfaces 121a, 122a, 123a and 124a. Thus, the excitation light entering the light entrance surfaces 121a, 122a, 123a and 124a can be emitted from the light emission surfaces 121b, 122b, 123b and 124b in a state where the light is collected.

As described above, the application regions S121, S122, S123 and S124 are selectively excited. Thus, it is possible to easily change the shape of the light projection pattern P.

As described above, the fluorescent member 22 is excited asymmetrically in the left/right direction. Thus, the light projection pattern P can be easily formed into a shape asymmetrical in the left/right direction.

As described above, the first focus F23a of the reflective member 23 is arranged on the lines Sm1 and Sm2 that are portions onto which the cutoff lines M1 and M2 of the light projection pattern P of the application region S121 are projected. Thus, it is possible to steeply switch light and dark on the cutoff lines M1 and M2, and it is particularly effective.

As described above, the first focus F23a of the reflective member 23 is arranged in such a position of the application region S121 that the elbow point E of the light projection pattern P is projected. In this way, it is possible to steeply switch light and dark in the vicinity of the elbow point E, and thus it is more effective. It is also possible to maximize the brightness in the vicinity of the elbow point E. In other words, it is possible to most illuminate the region (R1) directly in front of the automobile. The first focus F23a is arranged in such a part of the position (the center position of the application region S in the left/right direction) of the application region S121 that the elbow point E is projected, and thus the lower side portion of the light projection pattern P121 can be formed substantially symmetrically in the left/right direction.

As described above, the light emitted from the application regions S121, S122, S123 and S124 is reflected off the reflective surface 23a, passes through the second focus F23b (or the vicinity thereof) of the reflective surface 23a and is projected through the lens 25. Here, since the second focus F23b of the reflective surface 23a coincides with the focus F25 of the lens 25, the light projection pattern P formed by the lens 25 is more likely to reflect the shapes of the application regions S121, S122, S123 and S124. When the light is projected using the lens 25, as compared with the case where the light is projected using the reflective member 23 without provision of the lens 25, the light projection pattern P is more likely to reflect the shapes of the application regions S121, S122, S123 and S124. The reflective member 23 is provided, and thus it is possible to utilize, as illumination light, a large part of the light emitted from the fluorescent member 22 as compared with the case where the light is projected using the lens 25 without provision of the reflective member 23. In this way, it is possible to enhance the efficiency of utilization of the light.

As described above, the control portion 31 individually drives a plurality of semiconductor laser elements 11. Thus, it is possible to easily and individually control the excitation states (excitation or non-excitation) of the application regions S121, S122, S123 and S124.

As described above, since the light projection device 1 functions as the low beam and the high beam and also functions as a cornering light (or an AFS), it is possible to prevent the size of the light projection device 1 as a whole from being increased.

Second Embodiment

In a second embodiment, unlike the first embodiment described above, a case where the light projection device functions as the headlight (lighting unit) and the blinker (lighting unit) will be described with reference to FIGS. 16 to 19.

Figure 16:
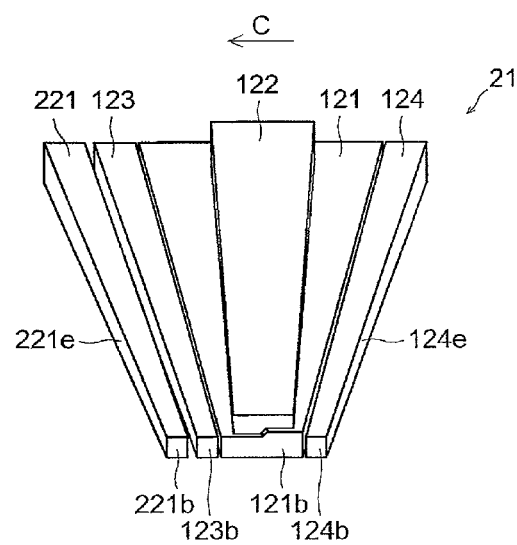
FIG. 16 is a perspective view showing the structure of a light collection member according to a second embodiment of the present invention.

In the light projection device according to the second embodiment of the present invention, as shown in FIG. 16, the light collection member 21 includes five light collection portions (light guide portions) 121 to 124 and 221. One laser generation device 10 is provided for the light collection portion 221. The output of the semiconductor laser element 11 corresponding to the light collection portion 221 is, for example, 0.3 W.

Figure 17:
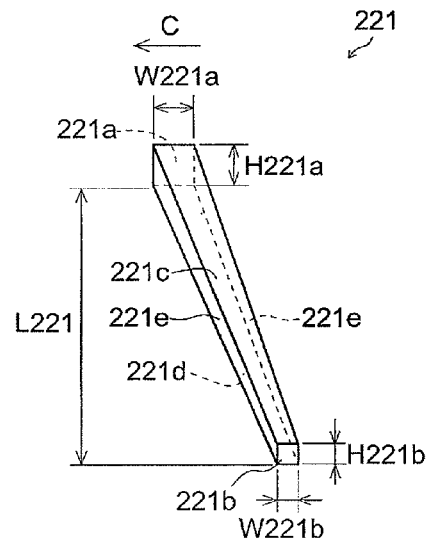
FIG. 17 is a perspective view showing the structure of a light collection portion 221 shown in FIG. 16 and according to the second embodiment of the present invention.

As shown in FIG. 17, the light collection portion 221 includes: a light entrance surface 221a through which the laser light emitted from the one semiconductor laser element 11 enters the light collection portion 221; a light emission surface 221b through which the laser light is emitted; and an upper surface 221c, a lower surface 221d and a pair of side surfaces 221e that are arranged between the light entrance surface 221a and the light emission surface 221b.

The light entrance surface 221a is formed in the shape of a square, and is formed in such a square that the light emission surface 221b has a smaller area than the light entrance surface 221a. Specifically, the light entrance surface 221a has a height of about 3 mm (H221a) and a width of about 3 mm (W221a). The light emission surface 221b has a height of about 1.5 mm (H221b) and a width of about 1.5 mm (W221b). The light collection portion 221 has a length of about 50 mm (L221).

The light collection portion 221 is arranged such that light emitted from the light emission surface 221b is applied to a fluorescent member 222, which will be described later.

The other structures and functions of the light collection portion 221 are the same as the light collection portions 121 to 124.

Figure 18:
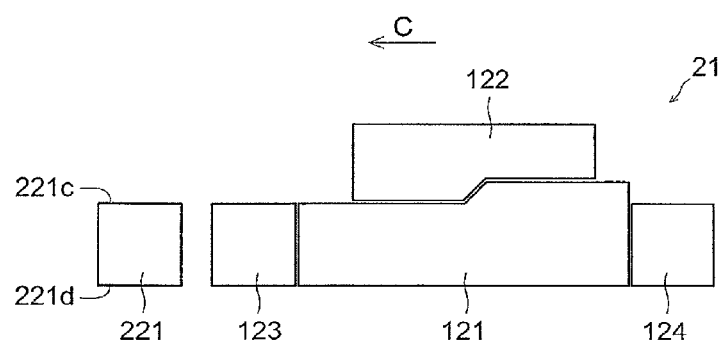
FIG. 18 is a front view showing the structure of a light emission surface of the light collection member shown in FIG. 16 and according to the second embodiment of the present invention.

The five light collection portions 121 to 124 and 221 are spaced, as shown in FIGS. 16 and 18, a predetermined distance apart from each other.

Figure 19:
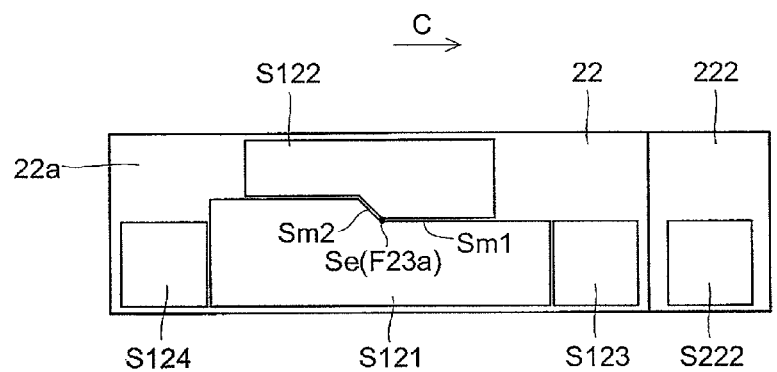
FIG. 19 is a front view showing the structure of an application surface of a fluorescent member according to the second embodiment of the present invention.

The light projection device according to the second embodiment of the present invention includes, as shown in FIG. 19, the fluorescent member 22 (first fluorescent member) and the fluorescent member 222 (second fluorescent member) arranged on the right side of the fluorescent member 22. The fluorescent member 222 contains an orange-colored fluorescent material that emits orange-colored light by the application of the excitation light (laser light) thereto. The fluorescent member 22 functions as the light source of the headlight, and the fluorescent member 222 functions as the light source of the blinker. An example of the orange-colored fluorescent material is α-SiAlON:EU.

The fluorescent member 22 is arranged in a region including the focus F23a of the reflective surface 23a of the reflective member 23. On the other hand, the fluorescent member 222 is arranged a predetermined distance away from the focus F23a of the reflective surface 23a of the reflective member 23 to the right side. Since the blinker projects the orange-colored light in a wide angular range, and does not need to project the orange-colored light in a predetermined direction, the fluorescent member 222 may be arranged farther away from the focus F23a of the reflective surface 23a, as compared with the position shown in FIG. 19.

The fluorescent member 222 includes an application region S222 to which the laser light (excitation light) is applied. The shape of the application region S222 is specified by the shape of the corresponding light emission surface 221b of the light collection portion 221.

In a case where this light projection device is used as, for example, the right headlight of the automobile, when the automobile turns right, if the switch for the right blinker is turned on by the driver, one semiconductor laser element 11 corresponding to the light collection portion 221 is driven to blink. Thus, the application region S222 of the fluorescent member 222 is intermittently excited, and the orange-colored light is blinked. In other words, the light projection device also functions as the blinker.

The other structures and functions in the second embodiment are the same as in the first embodiment described above.

In the present embodiment, as described above, the fluorescent member 22 to which the excitation light is applied to emit the white light and the fluorescent member 222 to which the excitation light is applied to emit the orange-colored light are provided, the fluorescent member 22 functions as the light source of the automobile (vehicle) headlight and the fluorescent member 222 functions as the light source of the blinker. In this way, one light projection device can function as the headlight and the blinker, and thus it is particularly effective.

As described above, the fluorescent member 222 is intermittently excited. Thus, it is possible to easily make the light projection device function as the automobile (vehicle) blinker.

The other effects in the second embodiment are the same as in the first embodiment described above.

Third Embodiment

In a third embodiment, unlike the first and second embodiments described above, a case where the light is projected by the reflective member 23 will be described with reference to FIG. 20.

Figure 20:
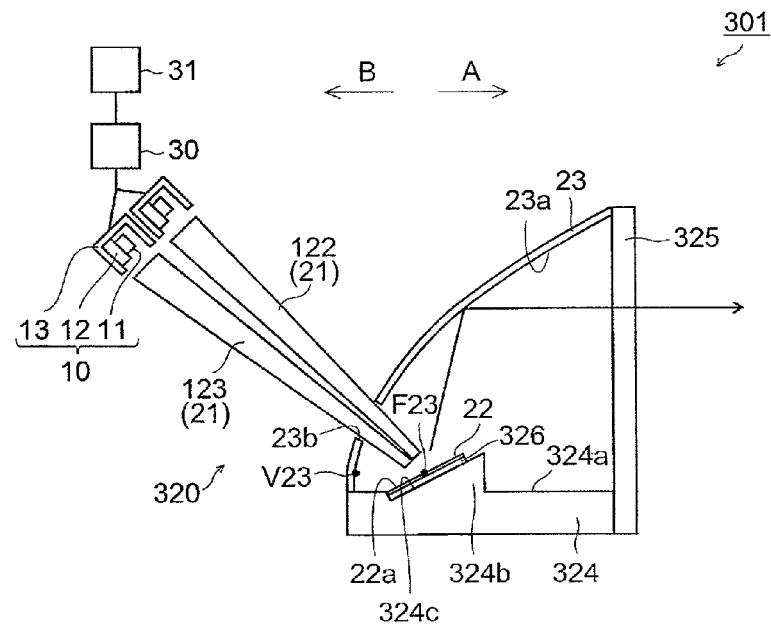
FIG. 20 is a cross-sectional view showing the structure of a light projection device according to a third embodiment of the present invention.

In a light projection device 301 according to the third embodiment of the present invention, as shown in FIG. 20, a light projection unit 320 includes the light collection member 21, the fluorescent member 22, the reflective member 23 (light projection member) that reflects the fluorescent light emitted from the fluorescent member 22 in a predetermined direction (A direction), an attachment member 324 to which the fluorescent member 22 is fixed and a filter member 325 that is provided in the opening portion of the reflective member 23. In the light projection device 301, the lens 25 is not provided.

The application surface 22a of the fluorescent member 22 is inclined upward in the light projection direction (A direction). The back surface (the opposite surface to the application surface 22a) of the fluorescent member 22 is in contact with a support plate 326 formed of aluminum.

The reflective surface 23a of the reflective member 23 is formed in a shape obtained by dividing a paraboloidal surface by a plane perpendicular (intersecting) an axis connecting the vertex V23 and the focus F23 and dividing the paraboloidal surface by a plane parallel to the axis connecting the vertex V23 and the focus F23. The reflective member 23 is formed in the shape of an approximate semicircle as seen in the A direction.

The reflective surface 23a has the function of reflecting the light from the fluorescent member 22 in the predetermined direction (A direction). In the light projection device 301, the light emitted from the fluorescent member 22 is projected by the reflective member 23.

The attachment member 324 is fixed to the reflective member 23. The upper surface 324a of the attachment member 324 is preferably formed to have the function of reflecting light. The attachment member 324 is formed of a metal, such as Al or Cu, that has satisfactory heat conductivity, and has the function of dissipating heat generated in the fluorescent member 22. On the upper surface 324a of the attachment member 324, an attachment portion 324b for fixing the fluorescent member 22 and the support plate 326 is integrally formed. An attachment surface 324c of the attachment portion 324b is inclined upward in the light projection direction (A direction). On the lower surface of the attachment member 324, a heat dissipation fin (not shown) is preferably provided.

In the opening portion (an edge portion in the A direction) of the reflective member 23, the filter member 325 is provided that shields (absorbs or reflects) the excitation light (light having a wavelength of about 405 nm) and that transmits the fluorescent light (red light, green light and blue light) whose wavelength has been converted by the fluorescent member 22. Specifically, the filter member 325 can be formed by using a glass material such as ITY-418 that is made by Isuzu Glass Co., Ltd. and that absorbs light having a wavelength of about 418 nm or less and transmits light having a wavelength of about 418 nm or more or L42 that is made by HOYA Corporation and that absorbs light having a wavelength of about 420 nm or less and transmits light having a wavelength of about 420 nm or more. The filter member 325 is provided in the opening portion of the reflective member 23, and thus it is possible to reduce the leakage of the laser light to the outside. The filter member 325 may be provided in the light projection device of other embodiments.

The other structures, operations and effects in the third embodiment are the same as in the first and second embodiments described above.

Fourth Embodiment

In a fourth embodiment, unlike the first to third embodiments described above, a case where light emitted from the back surface (the opposite surface to the application surface 22a) of the fluorescent member 22 is projected by the reflective member 23 will be described with reference to FIG. 21.

Figure 21:
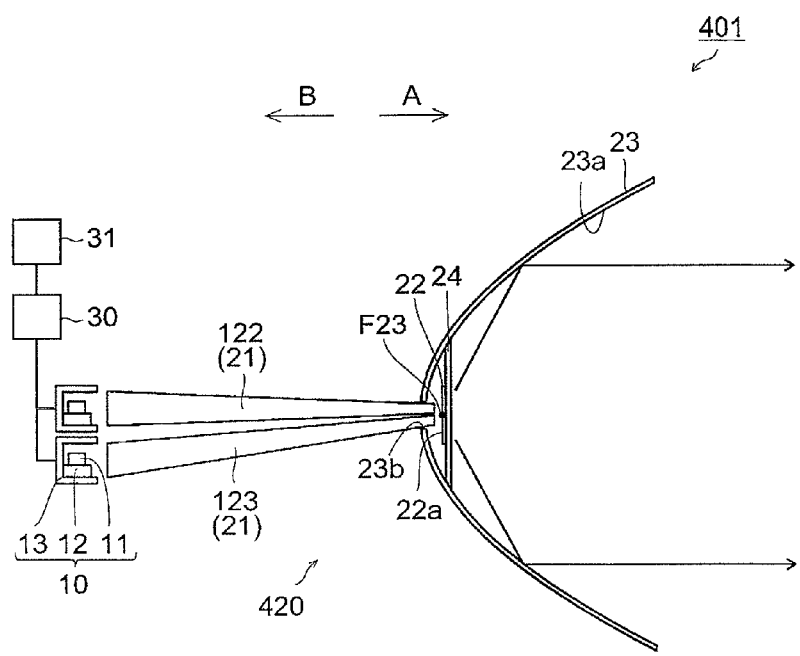
FIG. 21 is a cross-sectional view showing the structure of a light projection device according to a fourth embodiment of the present invention.

In a light projection device 401 according to the fourth embodiment of the present invention, as shown in FIG. 21, a light projection unit 420 includes the light collection member 21, the fluorescent member 22, the reflective member 23 and the support member 24. In the light projection device 401, the lens 25 is not provided.

The fluorescent member 22 is arranged in a position a few millimeters away from the vertex of the reflective surface 23a of the reflective member 23. The fluorescent member 22 is arranged in a region including the focus F23 of the reflective surface 23a of the reflective member 23; the point Se of the application region S121 of the fluorescent member 22 substantially coincides with the focus F23 of the reflective surface 23a.

When the laser light is applied to the fluorescent member 22, fluorescent light is emitted from the back surface (the opposite surface to the application surface 22a). For example, if the thickness of the fluorescent member 22 is reduced or the density of the fluorescent material particles is reduced, it is possible to easily emit the fluorescent light from the back surface.

The support member 24 has the function of transmitting the fluorescent light emitted from the fluorescent member 22, and is fixed to the reflective surface 23a of the reflective member 23. The support member 24 may be formed to shield (absorb) only the excitation light.

The reflective surface 23a of the reflective member 23 is a paraboloidal surface, and is formed in the shape of a circle as seen from the front.

In the present embodiment, the light passing through the light collection member 21 is applied to the application surface 22a of the fluorescent member 22. Then, the fluorescent light is emitted from the opposite surface to the application surface 22a, and is projected by the reflective surface 23a of the reflective member 23.

The other structures and effects in the fourth embodiment are the same as in the first and second embodiment.

Fifth Embodiment

The structure of a light projection device 501 according to a fifth embodiment of the present invention will now be described with reference to FIG. 22.

Figure 22:
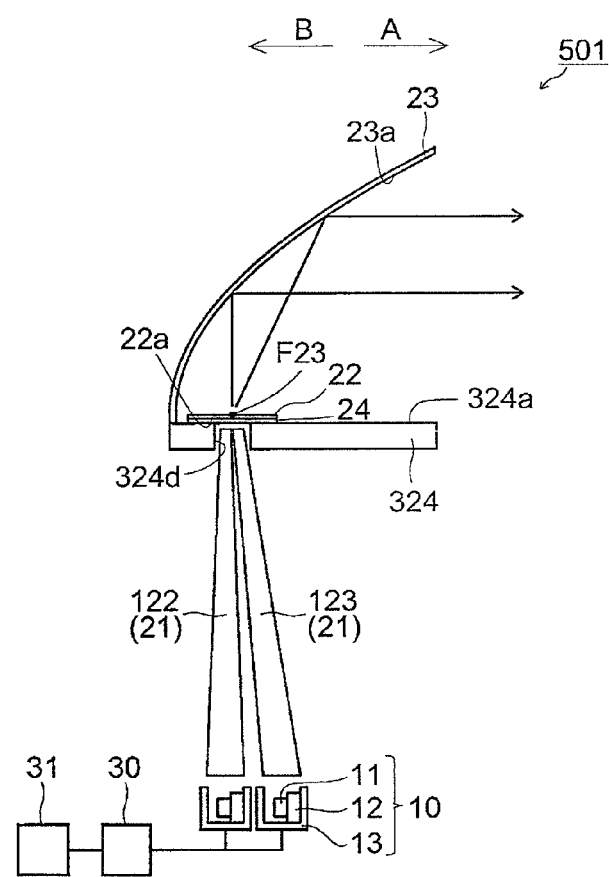
FIG. 22 is a cross-sectional view showing the structure of a light projection device according to a fifth embodiment of the present invention.

In the light projection device 501 according to the fifth embodiment of the present invention, as shown in FIG. 22, the through hole 23b is not formed in the reflective member 23, and a through hole 324d is formed in the attachment member 324. The laser generation devices 10 are arranged below the through hole 324d. On the upper side of the through hole 324d, the support member 24 and the fluorescent member 22 are arranged. The support member 24 is formed of a transparent glass or resin.

When the laser light is applied to the fluorescent member 22 of the present embodiment, the fluorescent light is emitted from the back surface (the opposite surface to the application surface 22a).

The support member 24 has the function of transmitting the excitation light. The support member 24 may have the function of reflecting the fluorescent light. The support member 24 may be in contact with the light emission surface of the light collection member 21.

In the present embodiment, the light passing through the light collection member 21 passes through the support member 24 and is applied to the application surface 22a of the fluorescent member 22. The fluorescent light is emitted from the opposite surface to the application surface 22a, and is projected by the reflective surface 23a of the reflective member 23.

The other structures and effects in the fifth embodiment are the same as in the first and second embodiments described above.

The embodiments disclosed herein should be considered to be illustrative in all respects and not restrictive. The scope of the present invention is indicated not by the description of the above embodiments but by the scope of claims, and further includes meanings equivalent to the scope of claims and all modifications within the scope.

For example, although, in the above embodiments, the example where the light projection device of the present invention is used as the automobile headlight has been described, the present invention is not limited to this example. The light projection device of the present invention may be used as the headlight of another mobile unit such as an airplane, a ship, a robot, a motorbike or a bicycle.

Although, in the above embodiments, the example where the light projection device of the present invention is applied to the headlight has been described, the present invention is not limited to this example. The light projection device of the present invention may be applied to other light projection devices such as a downlight or a spotlight.

Although, in the above embodiments, the example where excitation light is converted into visible light has been described, the present invention is not limited to this example. Excitation light may be converted into light other than visible light. For example, when excitation light is converted into infrared light, the light projection device can be applied to a nighttime illumination device for a security CCD camera or the like.

The center wavelength of the laser light emitted from the semiconductor laser element and the type of fluorescent material of the fluorescent member in the above embodiments can be changed as necessary. For example, a semiconductor laser element that emits blue laser light having a center wavelength of about 450 nm and a fluorescent material that converts part of the blue laser light into yellow light may be used. In this case, it is possible to obtain white light with the blue light and the yellow light. An example of the fluorescent material that converts part of the blue laser light into yellow light is $(Y_{1-x-y}Gd_xCe_y)_3Al_5O_{12}$ ($0.1 \leq x \leq 0.55$, $0.01 \leq y \leq 0.4$). Instead, the center wavelength of the laser light emitted from the semiconductor laser element may be freely selected among the scope of ultraviolet light to visible light.

Although, in the above embodiments, the example where the excitation light source (semiconductor laser element) and the fluorescent member are configured to emit the white light and the orange-colored light has been described, the present invention is not limited to this example. The excitation light source and the fluorescent member may be configured to emit light other than white light and orange-colored light.

Although, in the above embodiments, the example where the semiconductor laser element is used as the excitation light source emitting the laser light has been described, the present invention is not limited to this example. A laser generation unit (excitation light source) other than the semiconductor laser element may be used.

Although, in the above embodiments, the example where the laser light is used as the excitation light has been described, the present invention is not limited to this example. Excitation light other than laser light may be used. In this case, for example, a light-emitting diode element may be used as the excitation light source.

The values indicated in the above embodiments are examples; limitation is not placed on the values.

Although, in the above embodiments, the example where the reflective surface of the reflective member is formed with the part of the paraboloidal surface or the part of the elliptical surface has been described, the present invention is not limited to this example. The reflective surface may be formed with a multi-reflector composed of a large number of curved surfaces (for example, paraboloidal surfaces), a free-form surface reflector where a large number of minute flat surfaces are continuously provided or the like.

Although, in the above embodiments, the example where, for a country, such as Japan, in which automobiles drive on the left side, the light projection pattern of the low beam is formed in the shape obtained by cutting the upper right portion has been described, the present invention is not limited to this example. For a country where automobiles drive on the right side, the left and right portions of the light emission surface of the light collection portion are reversed, and thus the light projection pattern of the low beam can be formed in a shape obtained by cutting an upper left portion.

Although, in the above embodiments, the example where, as the light guide portion, the light collection portion including the light emission surface having a smaller area than the light entrance surface is used has been described, the present invention is not limited to this example. As the light guide portion, for example, an optical fiber, a reflective minor or a lens may be used.

Although, in the above embodiments, the example where the light guide portion is provided in the light projection device has been described, the present invention is not limited to this example. The light guide portion may not be provided in the light projection device.

Although, in the above embodiments, the example where the so-called CAN package semiconductor laser is used as the laser generation device has been described, the present invention is not limited to this example. For example, a plurality of semiconductor laser elements are mounted on the same mounting substrate, and a laser generation device in which those semiconductor laser elements are held in one holding member may be used. As the excitation light source, for example, a semiconductor laser array in which a plurality of laser element portions are formed on one semiconductor substrate may be used.

Although, in the above embodiments, the example where the outputs of a plurality of semiconductor laser elements are individually controlled has been described, the present invention is not limited to this example. A plurality of semiconductor laser elements are divided into groups according to, for example, the corresponding light collection portions, and the outputs may be controlled for each of the groups.

Figure 23:
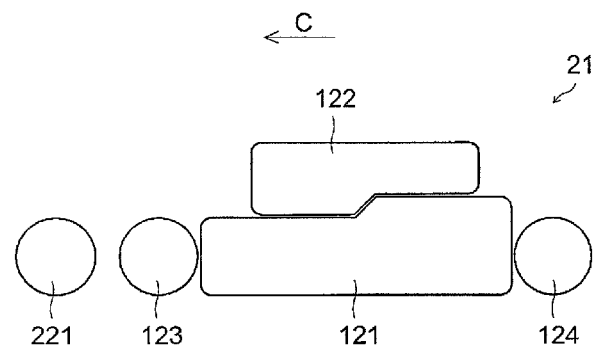
FIG. 23 is a front view showing the structure of a light emission surface of a light collection member according to a first variation of the present invention.

Although, in the above embodiments, the example where the light emission surface of the light collection portion is angular has been described, the present invention is not limited to this example. For example, the light emission surface may be shaped like the light collection member 21 shown in FIG. 23 and according to a first variation of the present invention. In other words, the light emission surface does not need to be angular, and its corner portions may be rounded. The light emission surface may be circular. The shape of the light emission surface is preferably set such that it is possible to obtain a necessary light projection pattern.

Figure 24:
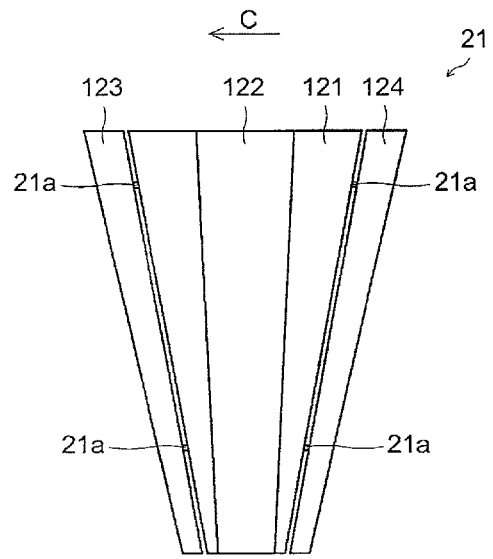
FIG. 24 is a plan view showing the structure of a light collection member according to a second variation of the present invention.

A plurality of light collection portions (light guide portions) may be integrally formed. For example, as with the light collection member 21 shown in FIG. 24 and according to a second variation of the present invention, a plurality of light collection portions 121 to 124 may be integrally formed using coupling portions 21a. Moreover, by sandwiching a metal layer (reflective layer) or the like between the light collection portions 121 to 124, the light collection portions 121 to 124 may be integrally formed.

Figure 25:
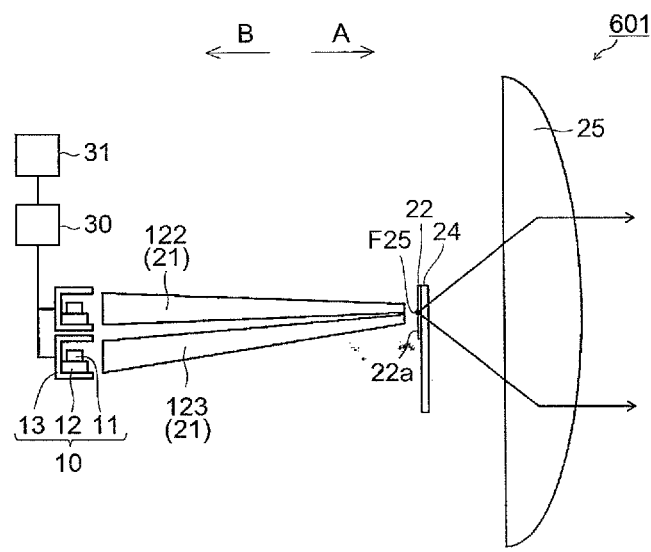
FIG. 25 is a cross-sectional view showing the structure of a light projection device according to a third variation of the present invention.

Although, in the above embodiments, the example where the reflective member and the lens are used as the light projection member or the reflective member is used has been described, the present invention is not limited to this example. For example, as with a light projection device 601 shown in FIG. 25 and according to a third variation of the present invention, only the lens 25 may be used as the light projection member. In this case, the focus F25 of the lens 25 may be arranged to substantially coincide with the point Se (the intersection of the lines Sm1 and Sm2) of the application region S121 of the fluorescent member 22. In this configuration, the light projection pattern P formed by the lens 25 is more likely to reflect the shape of the application region. When the light is projected using the lens 25, as compared with a case where the light is projected by the reflective member 23 without provision of the lens 25, the light projection pattern P is more likely to reflect the shape of the application region. As the light projection member, a prism or the like may be used instead of the reflective member and the lens.

Figure 26:
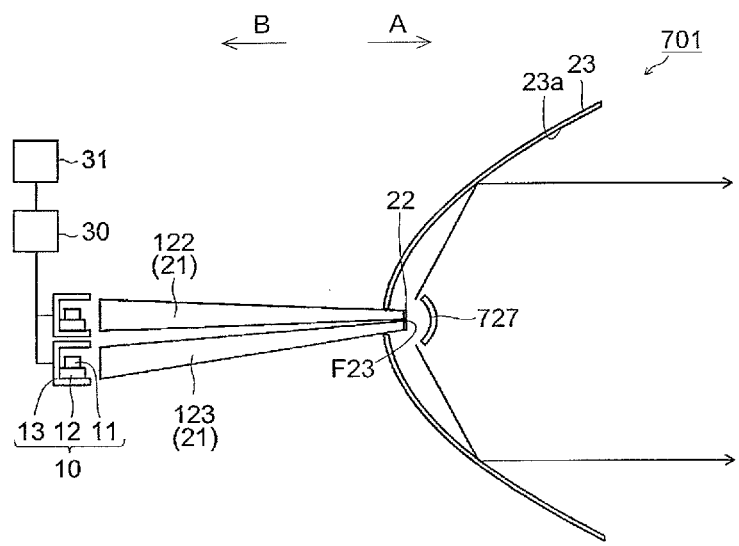
FIG. 26 is a cross-sectional view showing the structure of a light projection device according to a fourth variation of the present invention.

Although, in the above embodiments, the example where the light collection members are arranged a predetermined distance apart from the fluorescent member has been described, the present invention is not limited to this example. For example, as with a light projection device 701 shown in FIG. 26 and according to a fourth variation of the present invention, the light emission surface of the light collection member 21 may be in contact with the fluorescent member 22. This is true for, for example, the fourth and fifth embodiments. In the light projection device 701, a sub-reflective member 727 is provided in front of (the side of the A direction) the fluorescent member 22. In this way, it is possible to reduce the amount of light that is emitted forward without the intervention of the reflective member 23, and thus it is possible to easily control the light projection pattern. When excitation light passes through the fluorescent member 22, the excitation light can be applied again to the fluorescent member 22 by the sub-reflective member 727, with the result that it is possible to enhance the efficiency of utilization of the light. For example, in the fourth embodiment described above, the sub-reflective member 727 may be provided.

Figure 27:
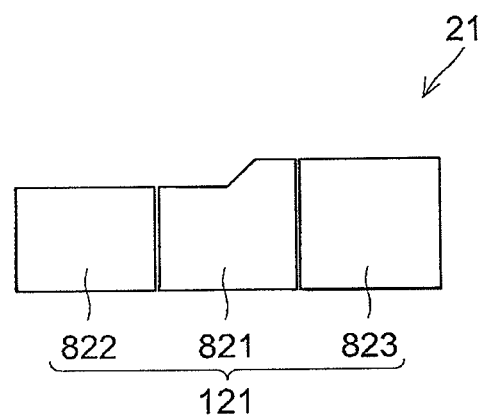
FIG. 27 is a diagram for illustrating the structure of a light collection portion according to a fifth variation of the present invention.

In the above embodiments, the example where a plurality of application regions are selectively excited has been described. In other words, the example where the shape of the light projection pattern (the shape of the light projection region) is changed has been described. However, the present invention is not limited to this example. The density of the light projection pattern may be changed (the light and dark of a certain region within the light projection region may be changed). For example, as with a fifth variation shown in FIG. 27 and according to the present invention, the light collection portion 121 is formed with three light collection portions 821, 822 and 823. For example, the output of a semiconductor laser element provided according to the light collection portion 821 in the center is increased or decreased, and thus an application region corresponding to the light collection portion 821 is excited by a high energy or a low energy. Thus, the light and dark of the light projection pattern in the center region is changed. Consequently, it is possible to change the density of the light projection pattern without changing the shape of the light projection pattern. The light collection portions 122, 123, 124 and 221 may be provided or may not be provided.

Configurations obtained by combining, as necessary, the embodiments and the variations described above also fall within the technical scope of the present invention.

What is claimed is:

1. A light projection device comprising:
   a plurality of excitation light sources that emit excitation light;
   a fluorescent member that is excited by the excitation light from the excitation light sources;
   a control portion that controls outputs of the excitation light sources; and
   a light projection member that projects light emitted from the fluorescent member,
   wherein the fluorescent member includes a plurality of application regions to which the excitation light is applied,
   the control portion controls the outputs of the excitation light sources so as to individually control excitation states of the application regions, and
   the fluorescent member is excited in an asymmetrical shape with respect to a predetermined direction.

2. The light projection device of claim 1, further comprising:
   a plurality of light guide portions, each including a light entrance surface through which the excitation light enters the light guide portion and a light emission surface through which the excitation light is emitted toward the fluorescent member.

3. The light projection device of claim 2,
   wherein each of the application regions is specified by a shape of the light emission surface of the corresponding light guide portion.

4. The light projection device of claim 2,
   wherein the light emission surface has a smaller area than the light entrance surface.

5. A light guide member that is used in the light projection device of claim 2, the light guide member comprising:
   a plurality of light guide portions.

6. The light projection device of claim 1,
   wherein the application regions are selectively excited.

7. The light projection device of claim 1,
   wherein a focus of the light projection member is arranged in an edge portion of the application region.

8. The light projection device of claim 7,
   wherein the light projection device is used as an automobile headlight, and
   the focus of the light projection member is arranged in such a part of the edge portion of the application region that a cutoff line of a light projection pattern is projected.

9. The light projection device of claim 8,
   wherein the focus of the light projection member is arranged in such a position of the application region that an elbow point of the light projection pattern is projected.

10. The light projection device of claim 1,
    wherein the light projection member includes a lens that transmits the light emitted from the fluorescent member.

11. The light projection device of claim 10,
    wherein the focus of the lens is arranged in the application region.

12. The light projection device of claim 1,
    wherein the control portion individually controls the outputs of the excitation light sources.

13. The light projection device of claim 1,
    wherein the excitation light includes laser light.

14. The light projection device of claim 1,
wherein the light projection device is used as a vehicle lighting unit.

15. The light projection device of claim 14,
wherein the light projection device is used as an automobile passing headlight and an automobile driving headlight.

16. The light projection device of claim 14,
wherein the light projection device is used as at least one of an automobile AFS (adaptive front-lighting system) and a cornering light.

17. A light projection device comprising:
a plurality of excitation light sources that emit excitation light;
a fluorescent member that is excited by the excitation light from the excitation light sources;
a control portion that controls outputs of the excitation light sources; and
a light projection member that projects light emitted from the fluorescent member,
wherein
the fluorescent member includes a plurality of application regions to which the excitation light is applied,
the control portion controls the outputs of the excitation light sources so as to individually control excitation states of the application regions,
the light projection member includes a lens that transmits the light emitted from the fluorescent member and a reflective member having a reflective surface that reflects the light emitted from the fluorescent member toward the lens,
the reflective surface is formed with an elliptical surface,
a first focus of the reflective surface is arranged in the application region, and
a second focus of the reflective surfaces coincides with a focus of the lens.

18. A light projection device comprising:
a plurality of excitation light sources that emit excitation light;
a fluorescent member that is excited by the excitation light from the excitation light sources;
a control portion that controls outputs of the excitation light sources; and
a light projection member that projects light emitted from the fluorescent member,
wherein
the fluorescent member includes a plurality of application regions to which the excitation light is applied,
the control portion controls the outputs of the excitation light sources so as to individually control excitation states of the application regions,
the fluorescent member includes a first fluorescent member to which the excitation light is applied to emit white light and a second fluorescent member to which the excitation light is applied to emit orange-colored light,
the first fluorescent member functions as a light source of a vehicle headlight, and
the second fluorescent member functions as a light source of a vehicle blinker.

19. The light projection device of claim 18,
wherein
the second fluorescent member is intermittently excited.

\* \* \* \* \*